H. G. KIMBALL.
GANG LAWN MOWER.
APPLICATION FILED JAN. 19, 1916.
1,320,151. Patented Oct. 28, 1919.
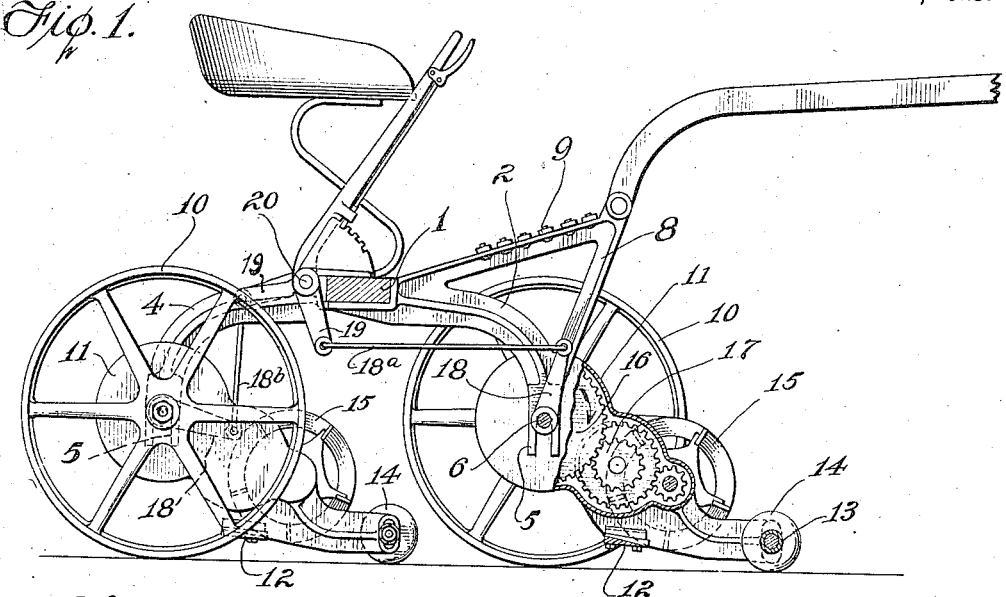
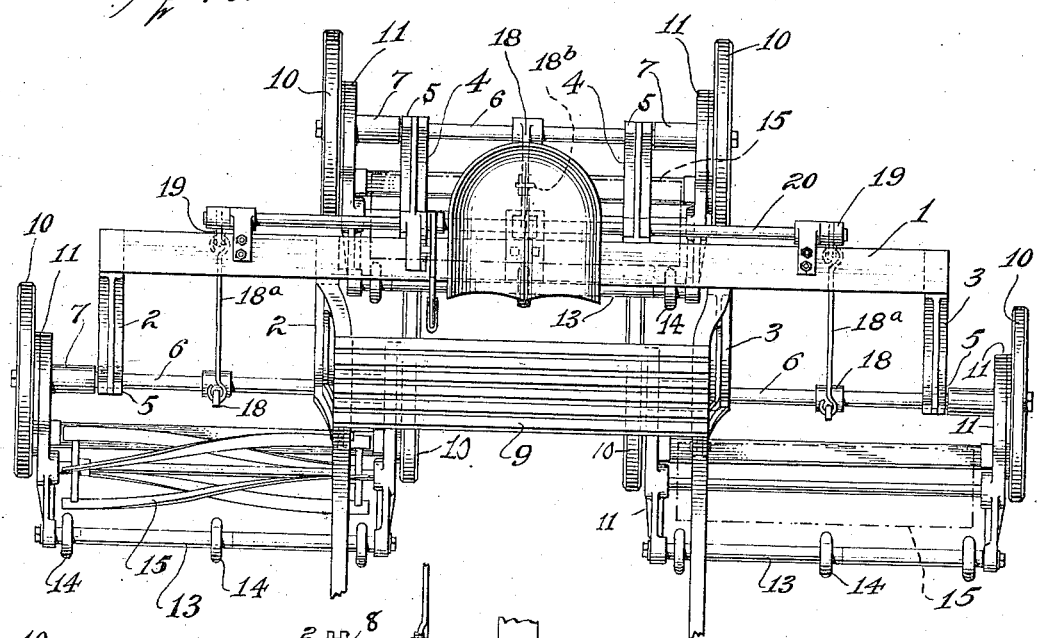
Inventor
Harry G. Kimball

UNITED STATES PATENT OFFICE.

HARRY G. KIMBALL, OF BRONXVILLE, NEW YORK, ASSIGNOR TO SHAWNEE MOWER COMPANY, OF SHAWNEE-ON-DELAWARE, PENNSYLVANIA, A CORPORATION OF NEW YORK.

GANG LAWN-MOWER.

1,320,151.     Specification of Letters Patent.     Patented Oct. 28, 1919.

Application filed January 19, 1916. Serial No. 72,894.

*To all whom it may concern:*

Be it known that I, HARRY G. KIMBALL, a citizen of the United States, residing at Bronxville, in the county of Westchester and State of New York, have invented the following-described Improvements in Gang Lawn-Mowers.

The improvement is in the organization of the several mower units whereby they accommodate undulating lawn surface by tilting vertically with respect to their uniting framework and are individually urged downward with an appropriate pressure at all angles of tilt but without the aid of springs or weights for that purpose. The individual mower units of gang lawn mowers require to be relatively light in weight in order not to constitute an excessive draft on the horse, and usually the thrust of the gear trains tends to lift the cutter mechanism from the ground so that when the machine is drawn forwardly, normally at a much faster rate than customary with hand mowers, there is developed a strong tendency for the cutters to kick up from the ground and skip patches of grass, especially where the grass is thick, and this tendency has only heretofore been overcome by the application of springs or other contrivances applied in a special manner so as not to interfere with the tilting or the rising and falling motions of the cutters. The present invention accomplishes the results of these devices without the attendant complication, weight and cost, in such manner that the maximum downward pressure is exerted only when the maximum density of grass is encountered, and then only by the particular unit or units, which encounters it, thereby producing easy draft of the machine as a whole and an especially uniform and thorough cutting effect. The invention also includes the structure of the uniting framework, the cutter-lifting mechanism and other matters of important detail, as explained below in connection with the preferred form shown in the accompanying drawing, wherein—

Figure 1 is a vertical section of the gang mower, with the forward right-hand cutter reel removed.

Fig. 2 is a top plan of Fig. 1, in smaller scale, with the cutter reels indicated by dotted lines in two of the units, for convenience; and Fig. 3 is a partial front elevation with reel removed.

The three units are held in echelon formation by the main frame superposed thereon and to which the horse shafts or other propelling connections are attached. Two units are arranged in front and the third in the rear and at the center where it cuts the grass left between the swaths of the front units, but the single unit could obviously be mounted in front and the two in rear, if preferred, so long as the machine as a whole is thereby enabled to cut a swath substantially equal to that of three units. In the present case the swath is nearly 90 inches, each unit having a 30 inch swath. The main frame rests upon and is wholly supported by the three units and is constituted of a cross-beam 1 and three pairs of bracket arms marked 2, 3 and 4, respectively, one pair for each unit. The pairs marked 2 and 3 project forwardly over the front units and the pair marked 4 projects rearwardly over the rear unit, all being securely and rigidly bolted to the central cross-beam. Each bracket arm terminates in a downwardly open fork or claw 5, and the claws of each pair of arms are straddled on the axle rod of its particular unit adjacent to and between the long hub bosses 7 on the side frames thereof. As thus held, the units are free to tilt vertically and independently within their fork slots according to the contour of the lawn surface over which they are advanced, thus accommodating undulating or irregular ground. The bosses 7 are longer than customary in hand lawn mowers, so that the claws are thus fairly near the center, which avoids too great concentration of weight on any one of the ground wheels, while still permitting the application of the lifter arms at the center of the rod, as presently explained. The main frame is equipped with a seat for the driver or operator, so mounted thereon as to distribute his weight in substantially equal proportions to each of the three units. This requires that the seat be substantially vertically above the beam, as shown in Fig. 1, which arrangement is intended to bring the center of gravity of the frame and its load somewhat nearer to the vertical plane of the front mowers than to that of the rear mower.

The proximate arms 2 and 3 of the two forward units are formed with upward and forward extensions 8 constituting a support for the slat platform 9 and also points of attachment for the horse shafts as indicated; the remaining arms may be duplicates of each other.

The several mower units are similar in principle of operation to the common hand lawn mower and may therefore follow standard design. The frames of these units, however, project forwardly from the axes of their respective ground wheels 10, and such frames consist of two side plates 11 rigidly connected by the axle or frame rod 6 and by the dead-knife structure 12 and also by the axle 13 of the cutter guide rollers 14, which normally support the forward end of the frame on the ground, the rear end being supported by the ground wheels, and the entire frame is of course capable of swinging vertically on the axis of said wheels as the guide rollers surmount the ground undulations. The side plates 11 constitute housings for the gear trains which drive the cutter reel 15, the latter being journaled in these housings in front of the axis of the ground wheels and in rear of the guide rollers 14. In this forward position of the unit frame and its cutter mechanism, it will be observed that the direction of the rotary thrust of the gear train is downward and tends to press the guide rollers 14 upon the ground, additionally to the gravitational pressure of the unit frame,—that is to say, the primary drive gear 16 of the said train (concentric to the ground wheel) rotates in the direction of the arrow and its pressure on the compound pinion 17, at its forward side, is therefore downward, with the result that the forward part of the train and of the unit frame which supports it, is pressed downwardly to an extent proportional to the resistance to rotation encountered by said train, which is of course represented by the load on the knives when cutting the grass. The same effect would of course result if the gear-train were constituted of any other form of power transmission suited for rotating the cutter reel. Thus, the cutter mechanism is pressed to the ground substantially in proportion to the work the cutter knives are performing, a condition which manifestly obtains regardless of the tilting of the unit in its forked holder, and which provides, in effect, an automatic adjustment of the pressure of each unit irrespective of the others and regardless of its or their angular position in the main frame, as, for example, when one of the units encounters a particularly thick patch of grass, in rough ground. None of the units presses or drags on the ground harder than necessary for the particular work it has to do, and thereby not only the springs, but the inconvenience of having to adjust them is wholly eliminated, and the general construction is therefore simple and light and easy to move about.

The three guide rollers 14 are spaced on their axle rod 13 with the intention of keeping the dead-knife 12 at an average height from the ground, to give a uniform length of cut, and they have narrow rounded treads so as not to press the grass down out of reach of the reel. Their position with relation to the axis of the ground wheels is determined with reference to the weight and design of the frame and its parts and they are of course of suitable diameter to ride freely over the lawn surface. The treads of the ground wheels 10 are also rounded, being flat in the middle and curved at the edges or sides, as shown in the drawings, so that they can slip sidewise on the lawn when necessary without gouging or injuring it. This provision enables the machine to turn corners or work on curves without adding the complication involved in the incorporation of a fifth-wheel joint in the frame, an advantage which is also promoted by the fact that the front and rear mower units are closely spaced and by the further fact that the driving gear-trains include the usual forward ratchet drive connection (not shown) permitting the ground wheels to rotate backwardly when necessary, without effect on the cutter reel. The rigid or non-articulate frame is lighter and more compact than if supplied with a fifth-wheel joint, so that the machine occupies less space in the shed.

In order to lift the cutting mechanism from normal cutting position, or to change its elevation so as to adapt it to make a high cut, the frame of each mower unit is equipped with a lifter arm 18, at its center, the arms on the forward units projecting upwardly and that on the rear unit projecting forwardly, and all of them connected by flexible links 18$^a$ and 18$^b$ to the crank arms 19 on a rock-shaft 20 journaled on the cross-beam 1. This rock-shaft is supplied with a latch lever and segment rack, at the side of the seat, whereby the guide rollers 14 can be raised from the ground in the obvious manner and the cutting mechanism set at any desired elevation. The links 18$^a$ and 18$^b$ are sufficiently long to accommodate the tilting of the mower units without straining the rock shaft, or the units, or altering the height of the cut when the machine is operated with the cutter guiding rollers 14 out of contact with the ground. In such adjustment the downward thrust exerted by the gear trains of the units is of course sustained by the linkage instead of by the guide rollers, but the action and effect are otherwise substantially the same.

It will be apparent from a consideration of the principles above explained that the invention is not limited to the particular form of embodiment specifically described, but may be incorporated in various forms with additional features and conveniences, if desired, and that various alterations, additions, omissions and substitutions may be made therein without departing from the invention as set forth in the following claims:

1. A gang lawn mower comprising a gang of lawn mower units having frame rods between their ground wheels, a main frame having a pair of forked holders engaging each frame rod at opposite sides of its center and supported thereby on said units whereby the latter may independently assume different angles of tilt, a lifter lever fastened to each unit between said holders, and flexible operating connections from said levers adapted to lift and support the cutter mechanisms of said units at an elevation from the ground.

2. A gang lawn mower comprising a main framework supported on a gang of mower units, the latter being free to tilt in vertical planes and independently of each other to accommodate undulating lawn surface, and comprising pairs of ground wheels with cutter reels journaled in front of said ground wheels and having gear-train driving connection therewith.

3. A gang lawn mower comprising a main framework supported on a gang of mower units, the latter being free to tilt in vertical planes and independently of each other to accommodate undulating lawn surface, and comprising pairs of ground wheels with cutter reels journaled in front of said ground wheels and having gear-train driving connection therewith, a cutter guiding means in front of said cutters and means applied to said units for lifting and supporting the cutters thereof at different elevations above the ground.

4. A gang lawn mower comprising a main framework supported on a gang of mower units, the latter being free to tilt in vertical planes and independently of each other to accommodate undulating lawn surface, and comprising pairs of ground wheels with cutter reels journaled in front of said ground wheels and having gear-train driving connection therewith, and means applied to said units and adapted to support the cutters thereof at an elevation above the ground.

5. A gang lawn mower comprising a main framework supported on a gang of lawn mower units, the latter being free to tilt in vertical planes and independently of each other to accommodate undulating lawn surface, and comprising pairs of ground wheels with cutter reels journaled in front of said ground wheels and gear-train driving connection therewith, a lever applied centrally to each unit and operating means therefor on the main frame, whereby the cutters of said units may be lifted from the ground.

6. A gang lawn mower comprising a main framework supported on a gang of mower units, the latter being free to tilt in vertical planes and independently of each other to accommodate undulating lawn surface, and comprising pairs of ground wheels with cutter reels journaled in front of said ground wheels and having gear-train driving connection therewith, and means for lifting the cutters of certain of said units comprising a horizontal lever arm, 18, disposed at substantially the level of the axes of the wheels of said units and a flexible lifting connection attached to the end of said arm.

7. A gang lawn mower comprising a gang of lawn mower units having frame-rods between their ground wheels, a main frame having a pair of forked holders engaging each frame-rod at opposite sides of its center and supported thereby on said units whereby the latter may independently assume different angles of tilt, a rock-shaft on said main frame, and flexible operating connections running from said shaft to said units adapted to lift and support the cutter mechanisms thereof at an elevation from the ground.

8. A gang lawn mower comprising a gang of mower units having frame-rods between their ground wheels, a main frame having rigidly fixed thereto a pair of holders engaging each frame-rod at opposite sides of its center and supported thereby on said units whereby the latter may independently assume different angles of tilt, said lawn mower units comprising pairs of ground wheels having rounded treads adapting said train and units to turn corners without gouging the lawn surface and also having rotary cutters driven by said ground wheels, and means for sustaining said cutters at an elevation from the ground surface.

9. A gang lawn mower comprising in combination, a main framework provided with draft means and carried by and uniting a gang of lawn mower units, each of which includes ground wheels and a unit frame carried by said wheels, said main framework having supporting connections to each of said unit frames at points substantially coinciding with the vertical planes of the axes of the ground wheels thereof and adapting said units to tilt in said planes independently of each other in accommodation to ground undulations, and a rotary cutter mechanism journaled in each unit frame and adapted to oscillate with said frame about the axis of its ground wheels and a gear train coöperating with said mechanism adapted to transmit the draft pull of the main frame into downward pressure on said mechanism proportional to the resistance to the rotation encountered thereby.

10. A gang lawn mower comprising in combination, a main framework provided with draft means and carried by and uniting a gang of lawn mower units each of which includes ground wheels and a unit frame carried by said wheels, and having supporting connections to each of said unit frames at points substantially coinciding with the vertical planes of the axes of the ground wheels thereof and adapting said units to tilt in said planes independently of each other in accommodation to ground undulations, and a rotary cutter mechanism journaled in each unit frame and adapted to oscillate, with said frame, about the axis of its ground wheels, means extending forwardly of the ground wheels of one or more of the units adapted to impart variable downward pressure to the cutter mechanism, and means for supporting said mechanism at an elevation from the ground against said downward pressure.

In testimony whereof, I have signed this specification.

HARRY G. KIMBALL.